US008605851B2

(12) United States Patent
Oda et al.

(10) Patent No.: US 8,605,851 B2
(45) Date of Patent: Dec. 10, 2013

(54) ROD BLOCK MONITOR

(75) Inventors: Naotaka Oda, Yokohama (JP); Yasushi Goto, Yokohama (JP); Tadashi Miyazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 315 days.

(21) Appl. No.: 11/494,541

(22) Filed: Jul. 28, 2006

(65) Prior Publication Data
US 2007/0063839 A1      Mar. 22, 2007

(30) Foreign Application Priority Data

Jul. 29, 2005 (JP) .................................. 2005-222206

(51) Int. Cl.
*G21C 17/00* (2006.01)
(52) U.S. Cl.
USPC ............................ 376/259; 376/258; 376/245
(58) Field of Classification Search
None
See application file for complete search history.

(56) References Cited

U.S. PATENT DOCUMENTS

| 3,565,760 | A | * | 2/1971 | Parkos et al. | 376/217 |
| 5,091,139 | A | * | 2/1992 | Chao et al. | 376/216 |
| 5,930,317 | A | * | 7/1999 | Kono | 376/259 |
| 2001/0036242 | A1 | * | 11/2001 | Hirukawa | 376/245 |

FOREIGN PATENT DOCUMENTS

| JP | 05-341083 | 12/1993 |
| JP | 8-10261 | 1/1996 |
| JP | 2001-051087 | 2/2001 |
| JP | 2003-121577 | 4/2003 |
| JP | 2006-71397 | 3/2006 |

\* cited by examiner

*Primary Examiner* — Jack W Keith
*Assistant Examiner* — Marshall O'Connor
(74) *Attorney, Agent, or Firm* — Oblon, Spivak, McClelland, Maier & Neustadt, L.L.P.

(57) ABSTRACT

To provide a rod block monitor in which irrespective of the selection or non-selection of a control rod, such a process is repeatedly executed that gain adjustment is performed at fixed intervals at all times to match a local area average value of signals of neutron detectors surrounding the control rod with a nuclear reactor average power and a block level appropriate to the local area average value of the neutron detector signals after the gain adjustment is set.

6 Claims, 4 Drawing Sheets

ROD BLOCK MONITOR

BACKGROUND OF THE INVENTION

1. Field of the Invention

The present invention relates to a rod block monitor for monitoring withdrawal of a control rod in a nuclear reactor.

2. Related Art

In a conventional rod block monitor (RBM), during a withdrawal operation of a control rod, positional information on the control rod that is an operational target is received from a control rod operating system, and only a signal of a neutron detector that surrounds the subject control rod is selected among the received signals indicating the positional information to perform a local area mean value calculation.

Among total 16 neutron detectors four of which are built in neutron detector strings at four locales which surround the selected control rod, two are selected from each of the neutron detector string to thereby execute averaging calculation of the total eight neutron detector signals.

After the neutron detector signal is detected, the local average value of the selected neutron detector signal is compared with the nuclear reactor average power. The gain is adjusted such that the local average value and the nuclear reactor average power are set equal to each other (null sequence), and thereafter, a block level appropriate to the local average value after the gain adjustment is selected (set up). While the local average value and a block level are compared with each other, when the local average value is larger than the block level, a signal for preventing the withdrawal of the control rod and a warning signal are output.

As such an RBM, there is a boiling water reactor RBM (for example, refer to Patent Document 1: Japanese Examined Patent Application No. 8-10261).

In this way, since the conventional local area RBM cannot monitor all reactor core areas at the same time due to the limitation of hardware processing ability, the monitoring area has been determined on the basis of selection control rod position information from the control rod operation system.

For this reason, the conventional RBM cannot monitor an appropriate area when the control rod position information from the control rod operation system is not correct. Furthermore, there is a problem, for example, in that it is necessary to provide a common take-in section for selected control rod position signals between the RBM and the control rod operation system and execute a soundness confirmation test on all the selected control rod position signals for ensuring reliability of the signals.

Examples of means for solving such a problem includes a method of monitoring an average value of all the local areas around the control rod at all times without depending on the selection control rod position information from the control rod operation system (all area RBM).

With the realization of the all area RBM, the RBM can perform monitoring independent from the control rod operation system which is the monitoring target. Even if the selected control rod position signal of the control rod operation system is not correct, it is possible to avoid a non-monitoring state. In addition, the common take-in section with the control rod operation system and the corresponding soundness confirmation test are eliminated, and thus it is possible to reduce the hardware costs and test expenses related thereto.

In addition, in order to realize the all area RBM, in relation to the above-mentioned null sequence and setup execution method, the following problem need be solved.

In the conventional local area RBM, after the selection control rod position information is obtained from the control rod operation system, the null sequence and setup are executed on the local area average value of the signals from the neutron detectors surrounding the target control rod.

On the other hand, in the all area RBM, independently from the control rod operation system, all the areas are monitored regularly and continuously. Therefore, the execution timing for the null sequence and setup of the conventional local area RBM cannot be applied.

SUMMARY OF THE INVENTION

Accordingly, the present invention has been made in view of the above-mentioned circumstances, and it is an object of the present invention to provide a rod block monitor which enables an execution method for null sequence and setup necessary for the realization of all area RBM and enables the application of the all area RBM to a nuclear power plant.

This and other objects can be achieved according to the present invention by providing a rod block monitor which includes: signal receiving means configured to receive signals of neutron detectors located substantially entire area in a nuclear reactor and output signals based on the cooling water flow quantity; average calculation means configured to perform a local area mean value calculation on the basis of the received neutron detector signals and gain calculation means for calculating local average power gain on the basis of the average-calculated neutron detector signals and the received output signals; block level setting means configured to receive the post gain adjustment local area average powers from the gain calculation means and flow quantity signals from the signal receiving means to set an appropriate block level; memory means configured to store gain calculation values found by the gain calculation means and block level set values set by the setting means; post gain adjustment local area average power calculation means configured to calculate post gain adjustment local area average power values on the basis of the gain calculation values stored in the memory means and the local area average power values from the average calculation means; and control rod withdrawal monitoring means configured to generate a control rod withdrawal prevention signal and a warning on the basis of the post gain adjustment local area average power values and the block level set values from the memory means when the local area average power values exceed the block levels, in which such a process is repeatedly executed as that the gain adjustment is performed at fixed intervals at all times to match a local area average value of the signals of the neutron detectors surrounding the control rod with a nuclear reactor average power and a block level appropriate to the local area average value of the neutron detector signals after the gain adjustment is set.

Therefore, according to the present invention, monitoring on the nuclear power plant can be conducted independently from the control rod operation system, and even if the selected control rod position signal is incorrect, the non-monitoring state can be avoided. In addition, as the common take-in section with the control rod operation system and the corresponding soundness confirmation test are eliminated, the all area RBM enabling the reduction in the corresponding hardware costs and test expenses can be applied to the actual plant.

Moreover, with the malfunction determination means through the monitoring on the gain calculation value with respect to the neutron detector signal, which is not performed in the prior art, it becomes possible to detect the malfunction which cannot conventionally detected.

DESCRIPTION OF THE PREFERRED EMBODIMENTS

Hereinafter, a rod block monitor according to embodiments of the present invention will be described with reference to the accompanying drawings.

Figure 1:
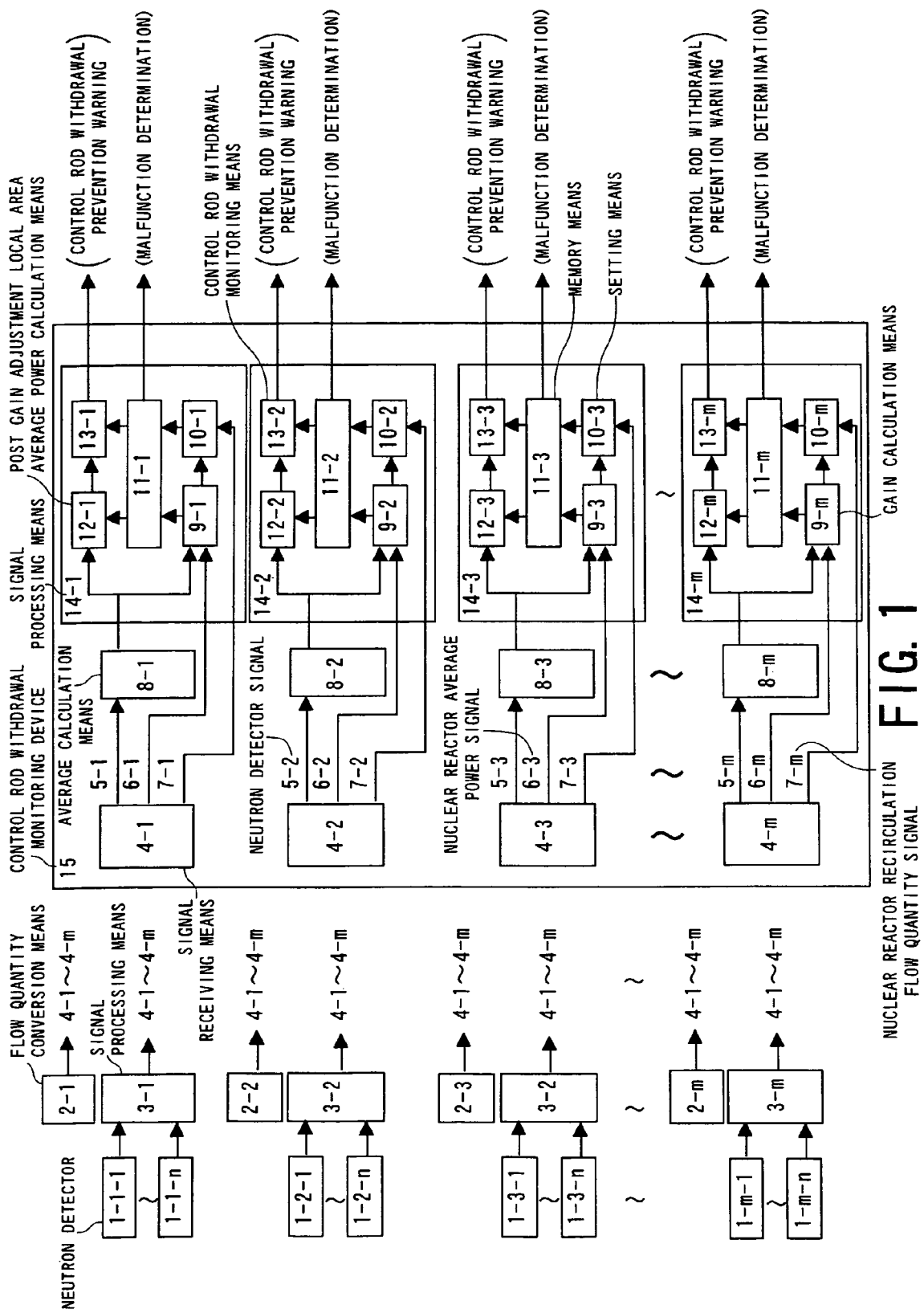
FIG. 1 is a system construction diagram showing a rod block monitor according to a first embodiment of the present invention.
Figure 2:
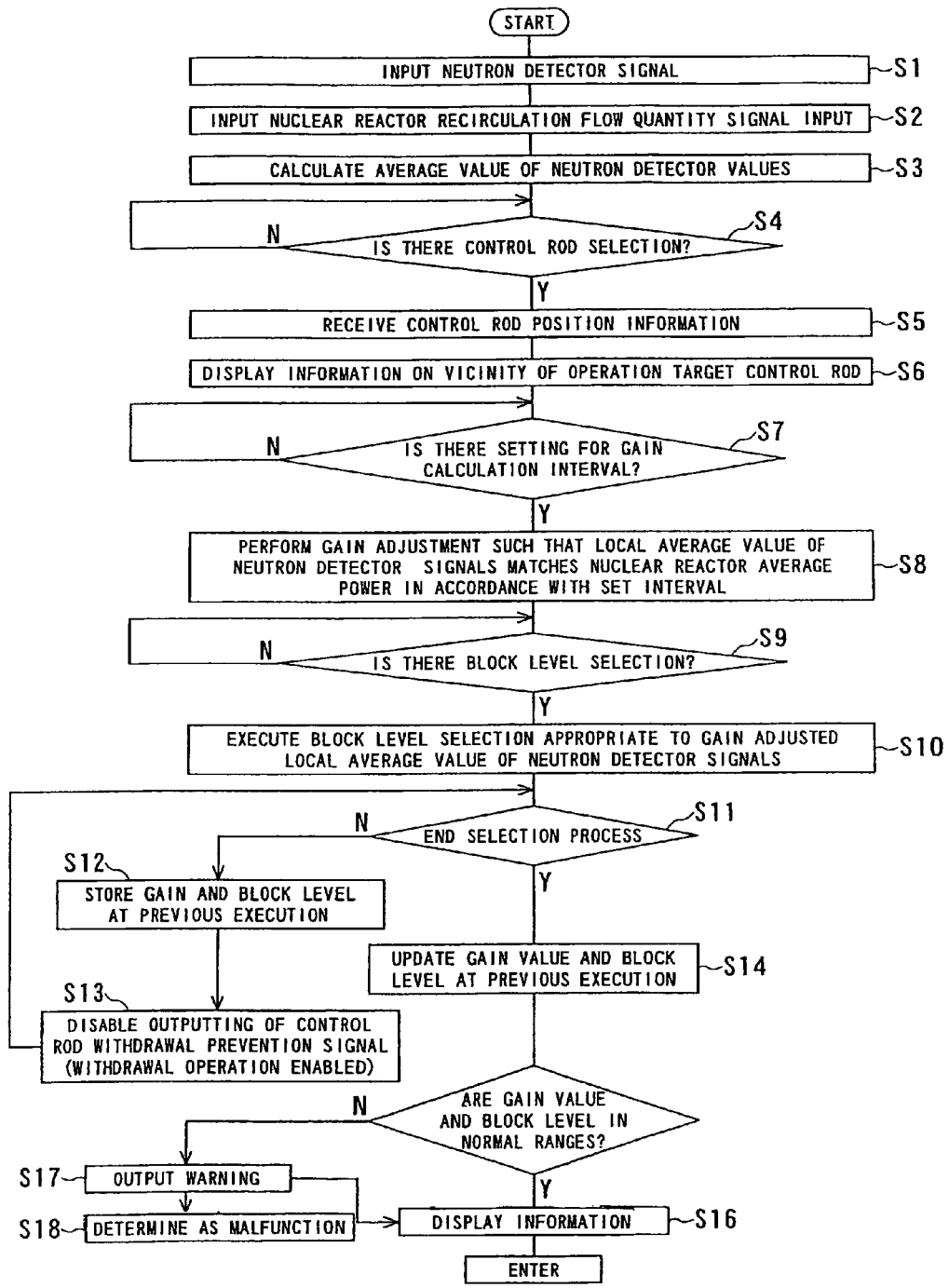
FIG. 2 is a flowchart showing an effect of the first embodiment of the present invention.

First Embodiment (FIGS. 1 and 2)

FIG. 1 is a system construction diagram showing a rod block monitor according to a first embodiment of the present invention, and FIG. 2 is a flowchart showing an effect of the first embodiment.

As shown in FIG. 1, a rod block monitor 15 according to this embodiment includes a plurality of signal receiving means (4-1 . . . 4-m) for receiving neutron detector signals from the neutron detectors (1-1-1 . . . 1-m-n) which are located at almost all the areas in the nuclear reactor and output signals based on the flow quantity of cooling water. That is, the neutron detector signals from the neutron detectors (1-1-1 . . . 1-m-n) are subjected to A/D conversion at a plurality of signal processing means (3-1 . . . 3-m) and received by the signal receiving means (4-1 . . . 4-m).

The output signals functioning as flow quantity oscillator signals based on the cooling water flow quantity are converted by flow quantity conversion means (2-1 . . . 2-m) into nuclear reactor recirculation flow quantity and received by the signal receiving means (4-1 . . . 4-m).

In addition, the rod block monitor 15 includes average calculation means (8-1 . . . 8-m) for receiving neutron detector signals (5-1 . . . 5-m) from the signal receiving means (4-1 . . . 4-m) to perform local area average calculation. Furthermore, in the rod block monitor 15, signal processing means (14-1 . . . 14-m) are provided. The signal processing means (14-1 . . . 14-m) are composed of gain calculation means (9-1 . . . 9-m), block level setting means (10-1 . . . 10-m), memory means (11-1 . . . 11-m), post gain adjustment local area average power calculation means (12-1 . . . 12-m), and control rod withdrawal monitoring means (13-1 . . . 13-m).

The neutron detector signals from the average calculation means (8-1 . . . 8-m) and nuclear reactor average power signals (6-1 . . . 6-m) from the signal receiving means (4-1 . . . 4-m) are input to the gain calculation means (9-1 . . . 9-m) to calculate the local average power gain.

Post gain adjustment local area average powers from the gain calculation means (9-1 . . . 9-m) and flow quantity signals (7-1 . . . 7m) from the signal receiving means (4-1 . . . 4-m) are input to the block level setting means (10-1 . . . 10-m) to set an appropriate block level.

The memory means (11-1 . . . 11-m) stores gain calculation values from the gain calculation means (9-1 . . . 9-m) and block level setting values from the setting means (10-1 . . . 10-m).

Gain calculation values from the memory means (11-1 . . . 11-m) and local area average power values from the average calculation means (8-1 . . . 8-m) are input to the post gain adjustment local area average power calculation means (12-1 . . . 12-m) to calculate post gain adjustment local area average power values.

The post gain adjustment local area average power values from the calculation means (12-1 . . . 12-m) and the block level setting values from the memory means (11-1 . . . 11-m) are input to the control rod withdrawal monitoring means (rod-block monitor means) (13-1 . . . 13-m). When the local area average power values exceed the block levels, a control rod withdrawal prevention signal and an alarm are generated.

The function or operation of the described embodiment will be described hereunder with reference to FIG. 2. First of all, the neutron detector signals from the neutron detectors (1-1-1 . . . 1-m-n) and nuclear reactor recirculation flow quantity signals are input to the signal receiving means (4-1 . . . 4-m) (Steps S1 and S2). On the basis of the neutron detector signals (5-1 . . . 5-m) from the signal receiving means (4-1 . . . 4-m), the average calculation means (8-1 . . . 8-m) perform the local area average calculation (Step S3).

Then, it is determined whether or not a selection of a control rod as an operation target exists (Step S4). When the selection exists (YES), information on the control rod position is received (Step S5). On the basis of the selection control rod position information from a control rod operation system, information on monitoring around the operation target control rod is generated to an external information display device and displayed (Step S6).

Next, a determination as to whether or not there is a setting for an interval of the gain calculation is repeatedly performed (Step S7). When there is a new setting at all times (YES), in accordance with the set interval, the gain adjustment is performed such that the average value of the neutron detector signals matches the nuclear reactor average power (Step S8). That is, in the all area RBM, without depending on the control rod position information from the control rod operation system, only information on the presence or absence of the control rod selection is received. When the control rod selection exists, the gain adjustment is performed such that the local area average value of the signals of the neutron detectors surrounding the control rod matches the nuclear reactor average power. During the execution of the gain adjustment, by storing the value before the execution, it is possible to continuously perform the control rod withdrawal operation without outputting the control rod withdrawal prevention signal.

Next, a determination as to whether or not there is a selection of the block level is performed (Step S9). An operator can manually select the block level. At all times, it is possible to vary the execution interval between the gain adjustment and the block level selection which are executed in fixed interval. As a result, a selection process of a block level appropriate to the local area average value of the signals of the neutron detectors after the gain adjustment is executed (Step S10). That is, in the all area RBM, irrespective of the selection or non-selection of the control rod, the gain adjustment is performed at all times such that a local area average value of the signals of the neutron detectors surrounding the control rod at fixed intervals matches a nuclear reactor average power, and a process of selecting a block level appropriate to the local area average value of the neutron detector signals after the gain adjustment is repeatedly executed.

Subsequently, a determination as to whether or not the selection process is completed (Step S11), in the case of "NO", the gain block level at the previous execution is stored (Step S12). That is, during the process of the gain adjustment and the block level selection, the gain value and the block level at the previous execution are stored, and these values are updated after the gain adjustment and the block level selection. In this case, the control rod withdrawal prevention signal is not generated (withdrawal operation capable) (Step S13).

When the selection process is completed (Step S11: YES), the gain value and the block level at the previous execution are updated (Step S14). Then, a determination as to whether or not the gain value and the block level are in normal ranges (Step S15). In the case of "YES", information is displayed (Step S16), and in the case of "NO", a malfunction is determined (Step S17). A warning or alarm is generated (Step S18), and information is also displayed.

In this way, according to this embodiment, the gain calculation by the gain calculation means (9-1 . . . 9-m) and the block level setting by the block level setting means (10-1 . . . 10-m) are executed in fixed interval at all times. During the gain calculation and the block level setting, by using the gain calculation value and the block level setting value at the previous execution which are stored by the memory means (11-1 . . . 11-m) to monitor the control rod withdrawal, it is possible to continuously perform the control rod withdrawal operation at all times.

Further, the memory means (11-1 . . . 11-m) monitor the gain calculation value input from the gain calculation means (9-1 . . . 9-m) and the stored gain calculation value at the previous execution, and when those values are out of the normal ranges, the malfunction determination can be done.

Therefore, according to the above-mentioned functions or operations, the monitoring independent from the control rod operation system can be performed, and even if the selected control rod position signal is incorrect, the non-monitoring state can be avoided. In addition, by eliminating the common take-in section with the control rod operation system and the corresponding soundness confirmation test, all the area RBM capable of reducing the corresponding hardware costs and the test expenses can be applied to the actual plant.

Furthermore, by the malfunction determination means through the monitoring on the gain calculation value to the neutron detector signals, which is not provided in the prior art, it becomes possible to detect the malfunction which cannot be detected in the prior art.

Moreover, examples of monitoring means for the nuclear reactor output oscillation include an output oscillation monitoring device (OPRM: Oscillation Power Range Monitor). For the four bundle of fuel, the OPRM uses 16 signals of neutron detectors surrounding the four bundle of fuel to monitor the output oscillation of the target fuel bundle.

The RBM and the OPRM have a common construction in which both of the RBM and the OPRM perform signal processing on the neutron detector signals, so that it is possible to share an interface with respect to the neutron detector signals.

By integrating the OPRM and the RBM to each other, the system can be simplified.

Figure 3:
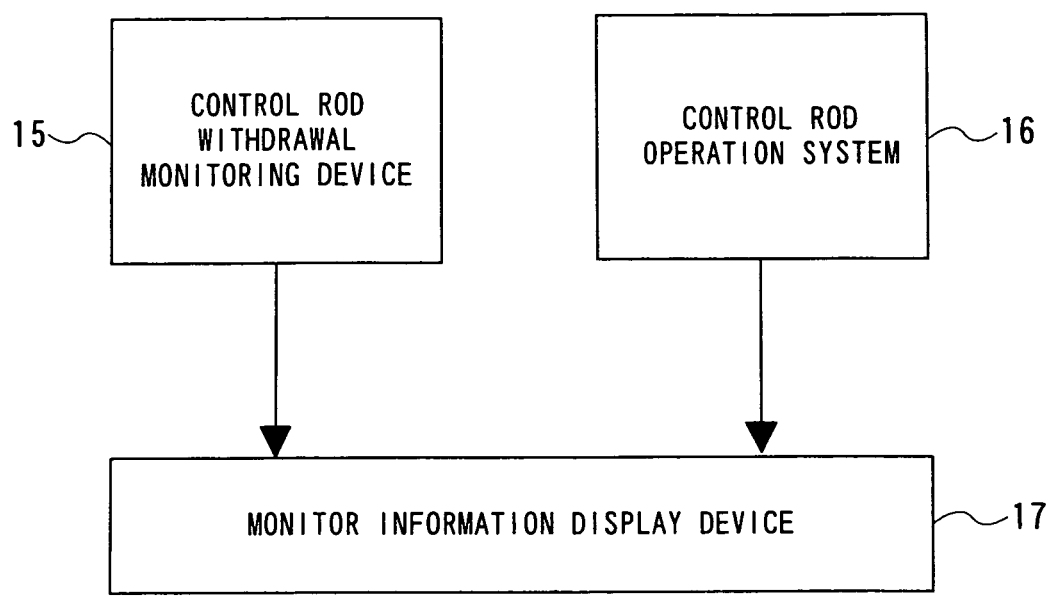
FIG. 3 is a system construction diagram showing a rod block monitor according to a second embodiment of the present invention.

Second Embodiment (FIG. 3)

FIG. 3 shows a structure according to a second embodiment of the present invention.

As shown in FIG. 3, according to this embodiment, the structure includes a monitor information display device 17 for receiving monitor information on the vicinity of the control rod sent from the rod block monitor 15 and selection control rod position information from a control rod operation system 16 to display the monitor information on the vicinity of the operation target control rod.

According to this embodiment, with such a structure, it is possible to provide the monitor information on the vicinity of the operation target control rod. Therefore, with respect to all the area RBMs independent from the control rod operation system, it is possible to provide the monitor information on the vicinity of the operation target control rod, which is necessary to the control rod operation by an operator in the actual plant activities.

It should be noted that the other constructions are substantially the same as those of the first embodiment, so that the description thereof will be omitted herein.

Figure 4:
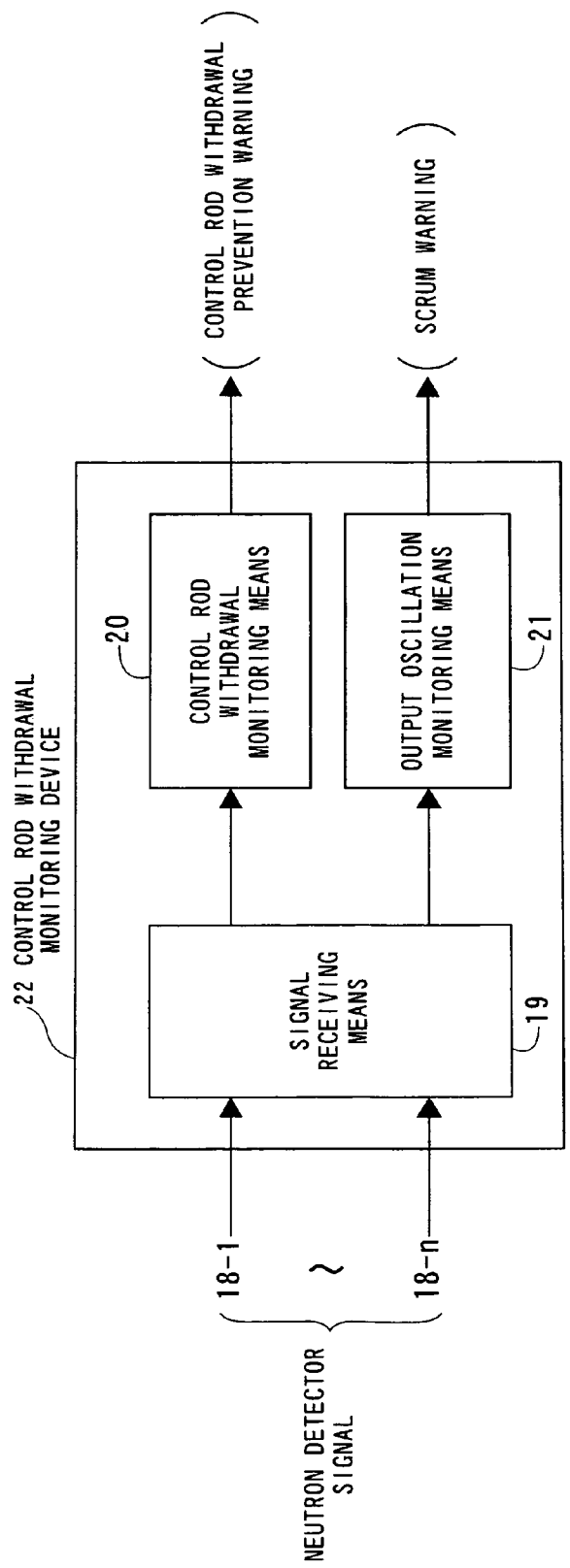
FIG. 4 is a system construction diagram showing a rod block monitor according to a third embodiment of the present invention.

Third Embodiment (FIG. 4)

FIG. 4 shows a structure according to a third embodiment of the present invention.

As shown in FIG. 4, according to this embodiment, the structure includes a plurality of neutron detector signals (18-1 . . . 18-n), signal receiving means 19 for receiving the neutron detector signals (18-1 . . . 18-n), a control rod withdrawal monitoring function 20 for receiving the neutron detector signals from the signal receiving means 19 to perform the control rod withdrawal monitoring for generating a control rod withdrawal prevention signal and an alarm, and an output oscillation monitoring function 21 for receiving the neutron detector signals from the signal receiving means 19 to perform output oscillation monitoring to output a scrum signal and an alarm. The signal receiving means 19, the control rod withdrawal monitoring function 20, and the output oscillation monitoring function 21 are built in a control rod withdrawal monitoring device 22.

It should be noted that the other constructions are substantially the same as those of the first embodiment, so that the description thereof will be omitted herein.

According to this embodiment, with such a structure, it is possible to provide the rod block monitor including the output oscillation monitoring function. Therefore, the output oscillation monitoring device and the rod block monitor can be integrated to each other, so that it is possible to reduce the hardware costs as compared with the case of independently providing the output oscillation monitoring device and the rod block monitor.

What is claimed is:
1. A rod block monitor, comprising:
a plurality of signal receiving units that receive signals of all neutron detectors located in substantially an entire area in a nuclear reactor, and then that output a neutron detecting signal from a neutron detector to be monitored in a local area, and nuclear reactor average output signals and flow quantity signals both based on the neutron detecting signals from all of the neutron detectors;
a plurality of average calculation units that each calculate a local area average power value based on the received neutron detector signal from the neutron detector to be monitored received by the signal receiving unit, and output the local area average power value;
a plurality of memory units that each store a gain calculation value and a block level set value;
a plurality of post gain adjustment local area average power calculation units that each calculate a post gain adjustment local area average power value based on the gain calculation value stored in the memory unit;
a plurality of control rod withdrawal monitoring units that each output a control rod withdrawal prevention signal and an alarm when the post gain adjustment local area average power value output from the post gain adjustment local area average power calculation unit exceeds the block level set value stored in the memory unit, and continuously monitor operation of the control rod withdrawal;

a plurality of gain calculation units that each calculate, at a repeated predetermined interval, a gain of the local area average power value to set the local area average power value equal to a nuclear reactor average power value based on the nuclear reactor average output signal output from the signal receiving unit, store the gain calculation value in the memory unit, and output the post gain adjustment local area average power value with respect to the local area average power value;

a plurality of block level setting units that each receive, at the repeated predetermined interval, the post gain adjustment local area average power value output from the gain calculation unit and set an appropriate block level set value based on the flow quantity signal output from the signal receiving unit, and store the block level set value in the memory unit; and a malfunction determination unit that is incorporated in the memory and that outputs a malfunction determination signal when a malfunction is observed, wherein the memory unit stores, during a process when the gain calculation unit performs a gain adjustment and the block level setting unit performs a selection of the block level setting value, stores the gain calculation value and the block level setting value during the performance, after the selection of the gain adjustment and block level, the gain calculation value and the block level setting value are renewed, the gain calculation value and the block level setting value during the performance and the renewed gain calculation value and the block level setting value are monitored, and when these values are out of normal ranges, the malfunction determination unit generates the malfunction determination signal.

2. The rod block monitor according to claim 1, wherein the predetermined interval is variably set.

3. The rod block monitor according to claim 1, wherein during the gain adjustment, the average calculation units each determine the local area average power value of the detectors for the control rod by holding the local area average power value before execution of the gain adjustment such that a control rod withdrawal operation of the control rod is continuously performed without generating the control rod withdrawal prevention signal.

4. The rod block monitor according to claim 1, further comprising an information display device that receives monitor information on a vicinity of the control rod in substantially the entire area in the nuclear reactor and selection control rod position information from a control rod operation system and displays the monitor information on the vicinity of the control rod for which gain adjustment is performed.

5. The rod block monitor according to claim 1, wherein the block level setting units allow manual block level selection by an operator.

6. The rod block monitor according to claim 1, further comprising an output oscillation monitoring unit that monitors a nuclear reactor output oscillation on the basis of the neutron detector signals from the signal receiving unit.

* * * * *